US012643368B2

(12) United States Patent
Shin et al.

(10) Patent No.: US 12,643,368 B2
(45) Date of Patent: Jun. 2, 2026

(54) AIR-CONDITIONING DEVICE FOR ELECTRIC MOBILITY AND AIR-CONDITIONING SYSTEM FOR ELECTRIC MOBILITY

(71) Applicants: Hyundai Motor Company, Seoul (KR); Kia Corporation, Seoul (KR)

(72) Inventors: Gee Young Shin, Suwon-Si (KR); Su Yeon Kang, Seoul (KR); Dae Hee Lee, Incheon (KR); Myung Hoe Kim, Seoul (KR); Dong Ho Kwon, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 669 days.

(21) Appl. No.: 17/867,954

(22) Filed: Jul. 19, 2022

(65) Prior Publication Data

US 2023/0136904 A1 May 4, 2023

(30) Foreign Application Priority Data

Nov. 3, 2021 (KR) ........................ 10-2021-0149931

(51) Int. Cl.
B60H 1/00 (2006.01)
(52) U.S. Cl.
CPC ..... B60H 1/00885 (2013.01); B60H 1/00278 (2013.01)

(58) Field of Classification Search
CPC ............ B60H 1/00849; B60H 1/00842; B60H 1/00835; B60H 1/00742
See application file for complete search history.

(56) References Cited

U.S. PATENT DOCUMENTS

2012/0241126 A1* 9/2012 Kishi ..................... B60H 1/008
165/42

FOREIGN PATENT DOCUMENTS

| CN | 111942111 A | * | 11/2020 | ............... A61L 9/20 |
| JP | 02068213 A | * | 9/1988 | |
| JP | 2001-010326 | | 1/2001 | |
| KR | 10 2008 0092527 | | 10/2008 | |
| KR | 10-2013-0105530 | | 9/2013 | |
| KR | 10-2019-0020353 | | 3/2019 | |
| KR | 10-2021-0112740 | | 9/2021 | |
| KR | 20230109951 A | * | 1/2022 | |

* cited by examiner

*Primary Examiner* — Devon Lane
(74) *Attorney, Agent, or Firm* — MORGAN, LEWIS & BOCKIUS LLP

(57) ABSTRACT

An air-conditioning apparatus for an electric mobility and an air-conditioning system using the same includes a heat pump used to provide high-temperature air generated through an internal condenser to an evaporator, removing condensed water generated in the evaporator after cooling, and sterilizing the evaporator.

19 Claims, 12 Drawing Sheets

FIG. 3

Accumulator

PTC heater

AIR-CONDITIONING DEVICE FOR ELECTRIC MOBILITY AND AIR-CONDITIONING SYSTEM FOR ELECTRIC MOBILITY

CROSS-REFERENCE TO RELATED APPLICATION(S)

The present application claims priority to Korean Patent Application No. 10-2021-0149931, filed on Nov. 3, 2021, the entire contents of which is incorporated herein for all purposes by this reference.

BACKGROUND OF THE PRESENT DISCLOSURE

Field of the Present Disclosure

The present disclosure relates to an air-conditioning device for an electric mobility and an air-conditioning system for an electric mobility, using the same, wherein a heat pump is used to provide high-temperature air to an evaporator, removing condensed water generated in the evaporator after cooling, and sterilizing the evaporator.

Description of Related Art

Recently, an electric vehicle has appeared as a social issue for implementing eco-friendly technologies and solving problems such as energy shortage. The electric vehicle operates by use of a motor which receives electricity from a battery and outputs power. Therefore, the electric vehicle is in the limelight as an eco-friendly vehicle in that carbon dioxide is not discharged, noise is very low, and the energy efficiency of a motor is higher than the energy efficiency of an engine.

The essential technology for realizing the electric vehicle is a technology regarding a battery module, and recently, active research has been conducted on battery weight reduction, battery miniaturization, battery charging time reduction, etc. A. A battery module should be used in an optimal temperature environment in order to maintain an optimum performance and a long lifespan.

Furthermore, the electric vehicle does not generate waste heat, which is generated during combustion in a separate engine like an internal-combustion engine, and thus performs heating in the vehicle by an electric heating device in winter. Furthermore, warm-up is needed to improve battery charging/discharging performance in cold weather, and thus a separate coolant-heating type electric heater is provided and used. That is, in order to maintain the optimal temperature environment for the battery module, the electric vehicle utilizes a technology of operating a cooling/heating system for adjusting the temperature of the battery module, independently of a cooling/heating system for air conditioning in the vehicle.

The electric vehicle utilizes an air-conditioning device to perform cooling in the vehicle in summer. That is, cooled air is generated by the circulation of a refrigerant and provided into the vehicle.

However, at the time of generating cooled air, an evaporator is operated, and thus condensed water is generated in the evaporator. The condensed water may contaminate the evaporator, causing odor. In order to solve the present problem, even when driving of the electric vehicle is stopped, a blower may be operated to remove the condensed water in the evaporator. However, the condensed water generated in the evaporator may not be completely removed.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air-conditioning apparatus for an electric mobility and an air-conditioning system for an electric mobility, using the same, wherein a heat pump is used to provide high-temperature air to an evaporator, removing condensed water generated in the evaporator after cooling, and sterilizing the evaporator.

In accordance with an aspect of the present disclosure, an air-conditioning apparatus for an electric mobility, may include: a housing which includes a main blower therein and in which air flows when the main blower operates; an internal condenser configured to heat air in the housing and an evaporator configured to cool air in the housing; an external condenser provided in a direction in which the internal condenser and the evaporator are arranged; an auxiliary blower provided so that air flows outside the housing through the internal condenser, the evaporator, and the external condenser; a flow channel control door configured to selectively regulate the air flow caused by the main blower or the auxiliary blower; and a controller configured to control the flow channel control door so that air flows inside by operation of the main blower while the air is cooled or heated, and such that, while condensed water of the evaporator is removed and the evaporator is sterilized, air is heated through the internal condenser by operation of the auxiliary blower and then provided to the evaporator.

The housing may include a first housing, in which main blower is provided to make outside air or inside air flow, and a second housing, which fluidically-fluidically-communicates with the first housing and in which the internal condenser, the evaporator, the external condenser, and the auxiliary blower are provided.

The second housing may be divided into a first space, in which the internal condenser and the evaporator are provided, and a second space, in which the external condenser and the auxiliary blower are provided, the first housing may fluidically-communicate with the first space of the second housing through a first flow channel, the first space and the second space of the second housing may fluidically-communicate with each other through a second flow channel, and the flow channel control door may be provided to selectively open or close the first flow channel and the second flow channel.

A temperature adjustment door may be provided between the internal condenser and the evaporator in the housing, and air may selectively flow to the internal condenser and the evaporator by the temperature adjustment door.

The controller may perform control during air cooling so that the main blower operates, an air cooling operation by the evaporator is activated, the flow channel control door opens the first flow channel, and the temperature adjustment door blocks the air flow to the internal condenser.

The controller may perform control during air heating so that the main blower operates, an air cooling operation by the evaporator is deactivated, the flow channel control door opens the first flow channel, and the temperature adjustment door allows the air flow to the internal condenser.

The controller may perform control during the sterilization of the evaporator so that the auxiliary blower operates, an air cooling operation by the evaporator is deactivated, the flow channel control door opens the second flow channel, and the temperature control door allows the air flow to the internal condenser.

In the second space of the second housing, a third flow channel, through which outside air flows, may be formed, and an external flow channel door configured to selectively open or close the third flow channel may be provided.

The controller may be configured to control the external flow channel door to open the third flow channel while air is cooled or heated, and may control the external flow channel door to close the third flow channel while the evaporator is sterilized.

The internal condenser, the evaporator, the external condenser, and the auxiliary blower may be provided in a straight line in the second housing.

The controller may receive information about whether there is a passenger in the mobility when sterilizing the evaporator, and may control the sterilization of the evaporator to be performed when the controller concludes that there is no passenger in the mobility.

In accordance with an aspect of the present disclosure, an air-conditioning system for an electric mobility may include: a refrigerant line in which a refrigerant is circulated and which includes a compressor, an internal condenser, an external condenser, an expander, and an evaporator; and a coolant line in which a coolant is circulated and which includes a heat exchanger, in which the coolant exchanges heat with the refrigerant, a valve, an electronic equipment module, a battery module, and a radiator.

The coolant line may include: a first coolant line, which includes the radiator, a first heat exchanger, a reservoir, a first water pump, the electronic equipment module, and a first valve; and a second coolant line, which branches from the reservoir of the first coolant line and includes a second valve, the battery module, a second water pump, and a second heat exchanger.

The refrigerant line may include: a first refrigerant line, which includes the compressor, the internal condenser, the first heat exchanger, a first expander, the external condenser, a second expander, and the evaporator; and a second refrigerant line, which branches from the first refrigerant line, is connected to the compressor, and includes a third expander and the second heat exchanger.

During air cooling, the first expander may be opened, the second expander and the third expander may expand the refrigerant, and the first valve and the second valve may be switched so that the coolant is circulated in the first coolant line and the second coolant line, respectively.

During the sterilization of the evaporator, the first expander may expand the refrigerant, the second expander may be closed, the third expander may be opened, and the first valve and the second valve may be switched so that the coolant is circulated in the second coolant line, together with the first water pump and the electronic equipment module of the first coolant line.

In an air-conditioning apparatus for an electric mobility, having the above-described structure, and an air-conditioning system for an electric mobility, using the same, a heat pump may be used to provide high-temperature air generated through an internal condenser to an evaporator, removing condensed water generated in the evaporator after cooling, and sterilizing the evaporator.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 illustrates elements of an air-conditioning apparatus for an electric mobility according to an exemplary embodiment of the present disclosure;

Figure 1:
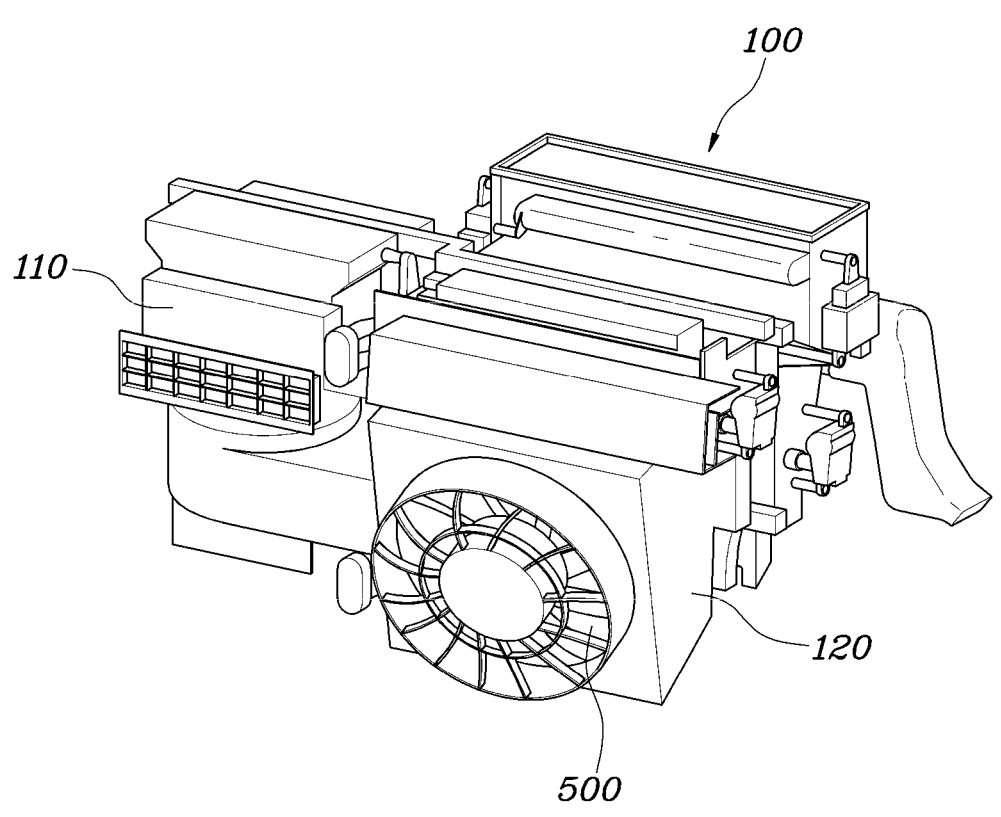
FIG. 1 illustrates an air-conditioning apparatus for an electric mobility according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, in accordance with an exemplary embodiment of the present disclosure, an air-conditioning apparatus for an electric mobility and an air-conditioning system for an electric mobility, using the same will be described with reference to the accompany drawings.

FIG. 1 illustrates an air-conditioning apparatus for an electric mobility according to an exemplary embodiment of the present disclosure.

Figure 2:
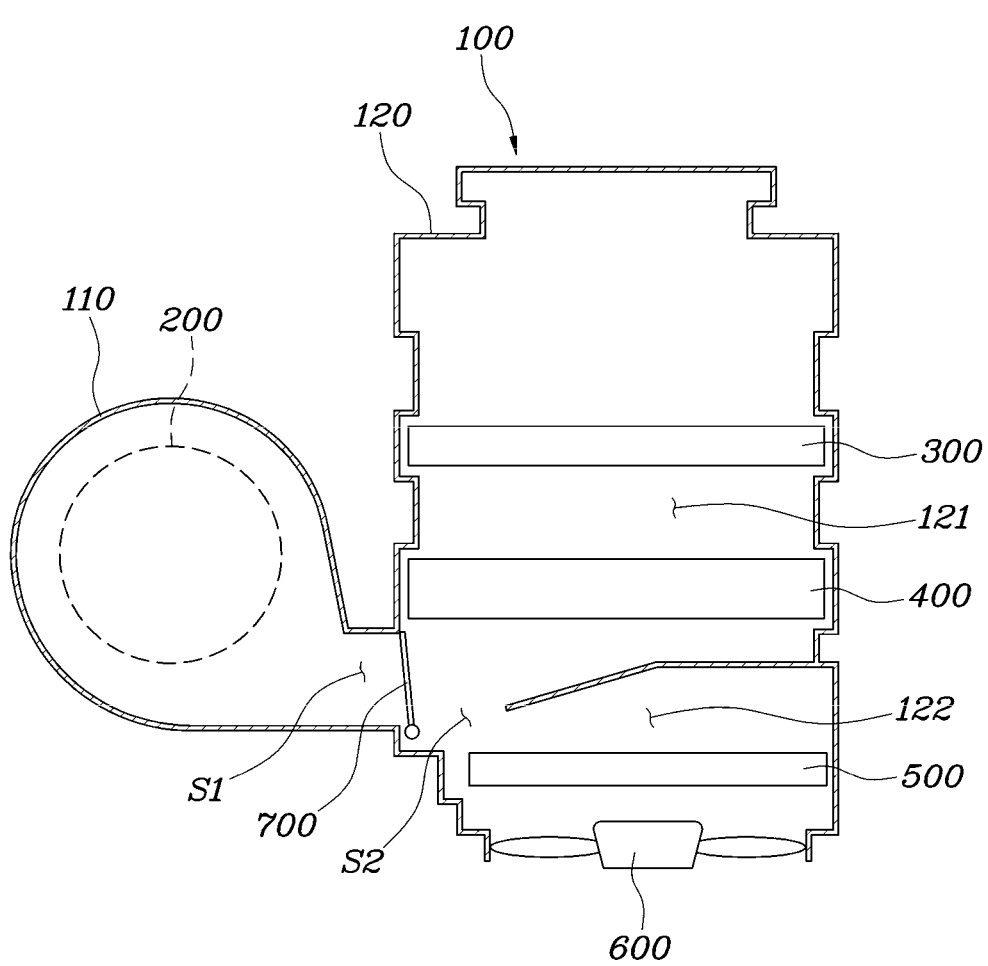
FIG. 2 is a top cross-sectional view of the air-conditioning apparatus for an electric mobility, illustrated in FIG. 1.
Figure 3:
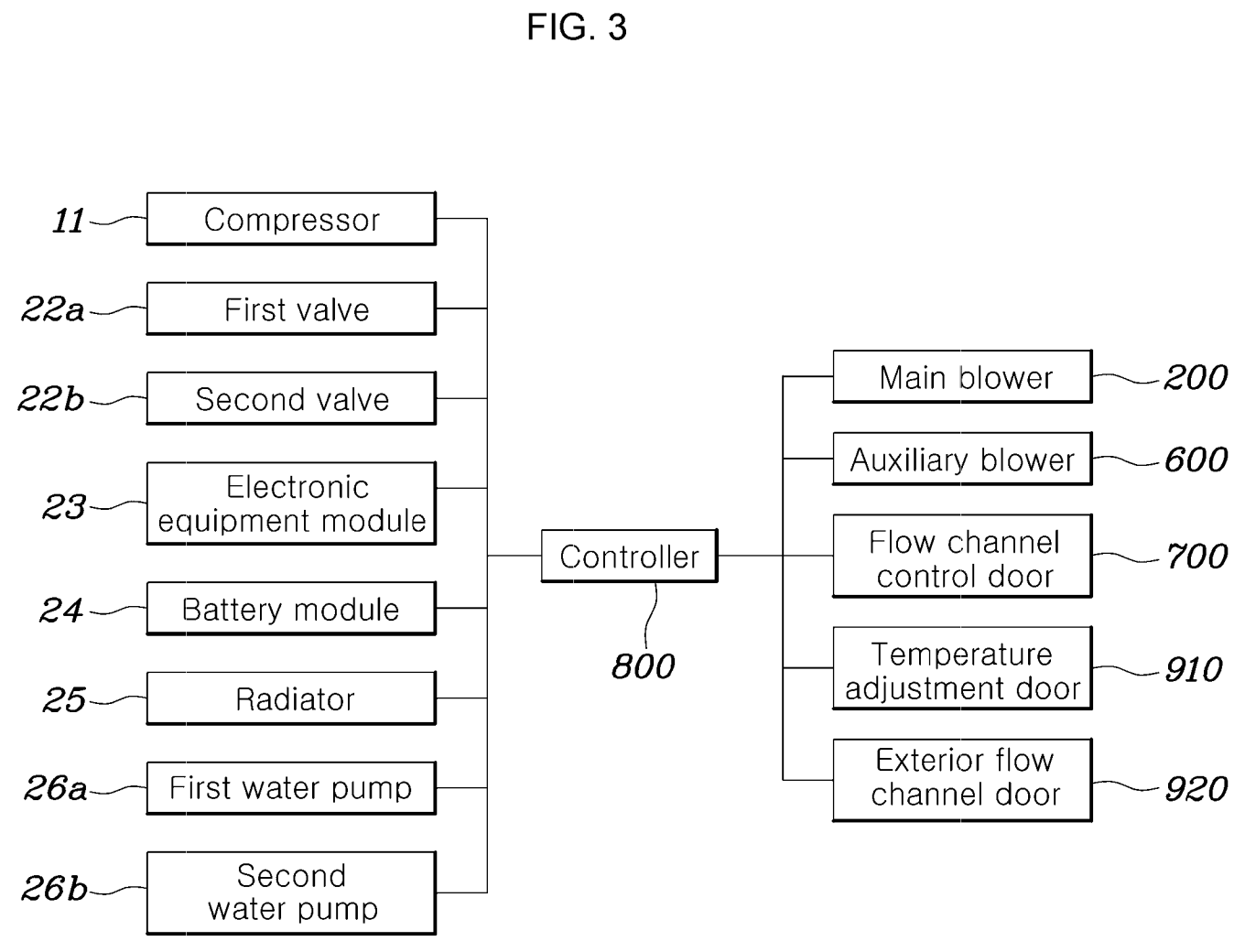
Figure 4:
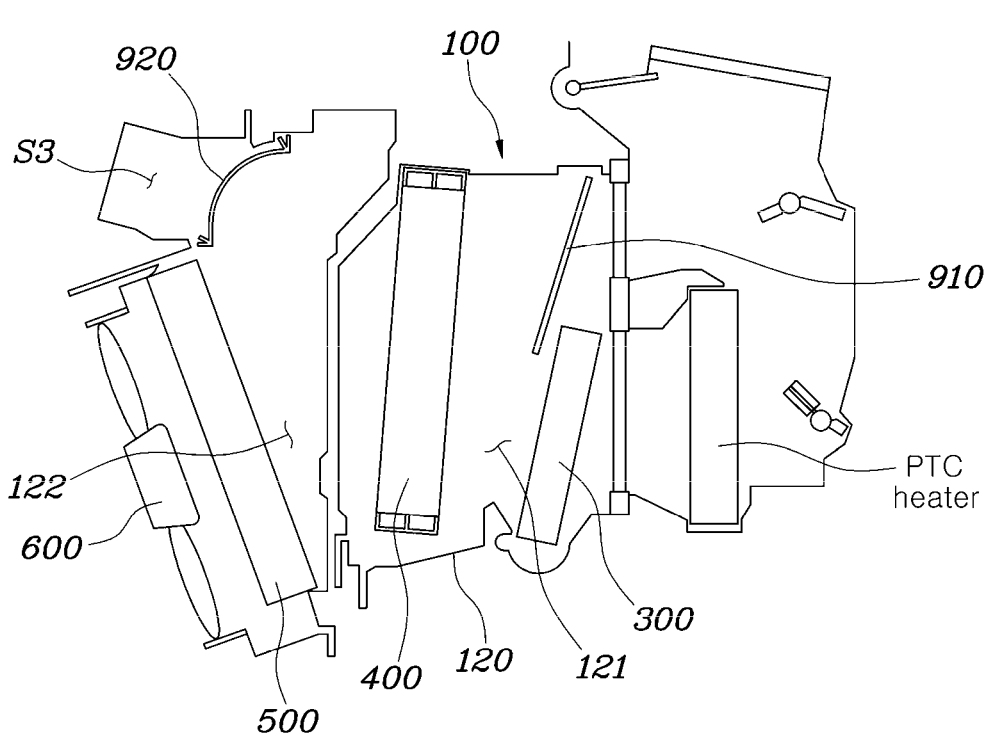
FIG. 4 is a side cross-sectional view of the air-conditioning apparatus for electric mobility, illustrated in FIG. 1.

FIG. 2 is a top cross-sectional view of the air-conditioning apparatus for an electric mobility, illustrated in FIG. 1. FIG. 3 illustrates elements of an air-conditioning apparatus for an electric mobility according to an exemplary embodiment of the present disclosure. FIG. 4 is a side cross-sectional view of the air-conditioning apparatus for an electric mobility, illustrated in FIG. 1.

Figure 5:
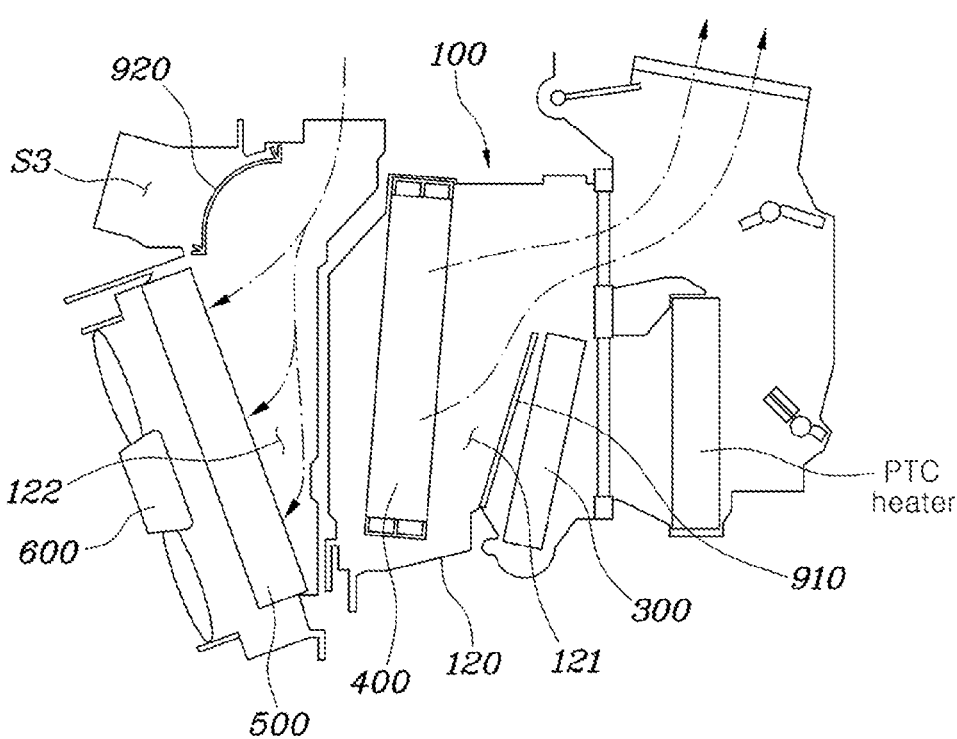
FIG. 5 and FIG. 6 illustrate a cooling mode of the air-conditioning apparatus for an electric mobility, illustrated in FIG. 1.
Figure 6:
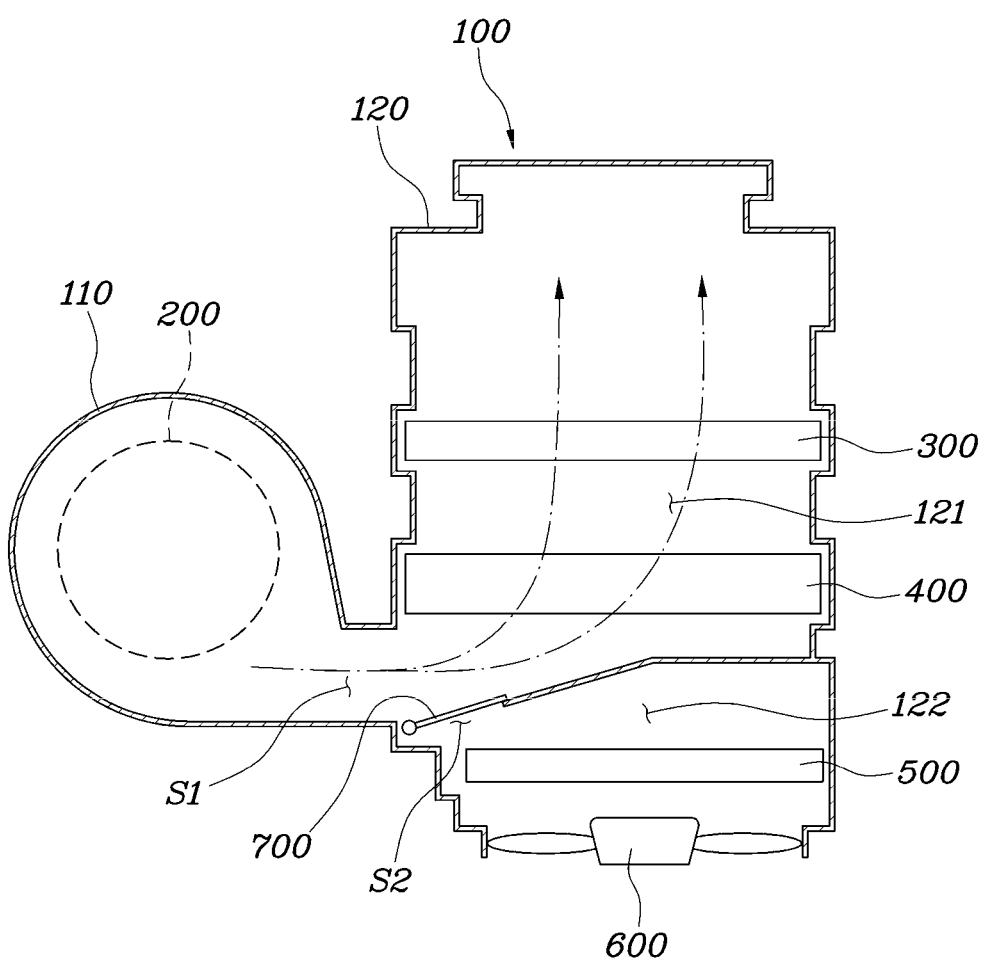

FIG. 5 and FIG. 6 illustrate a cooling mode of the air-conditioning apparatus for an electric mobility, illustrated in FIG. 1.

Figure 7:
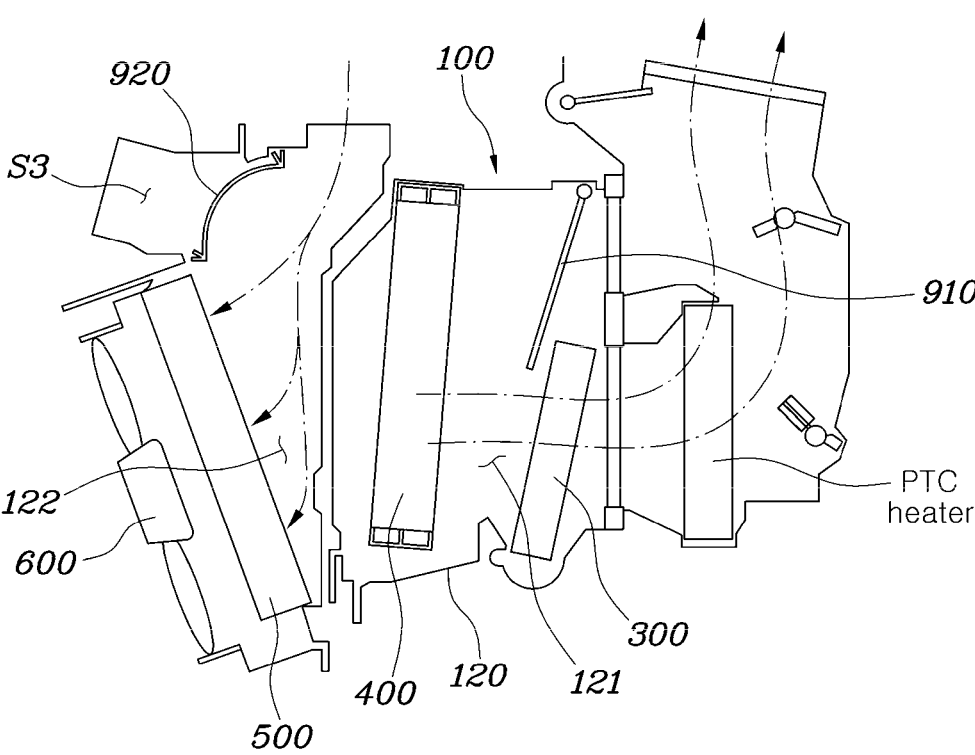
FIG. 7 illustrates a heating mode of the air-conditioning apparatus for an electric mobility, illustrated in FIG. 1.

FIG. 7 illustrates a heating mode of the air-conditioning apparatus for an electric mobility, illustrated in FIG. 1.

Figure 8:
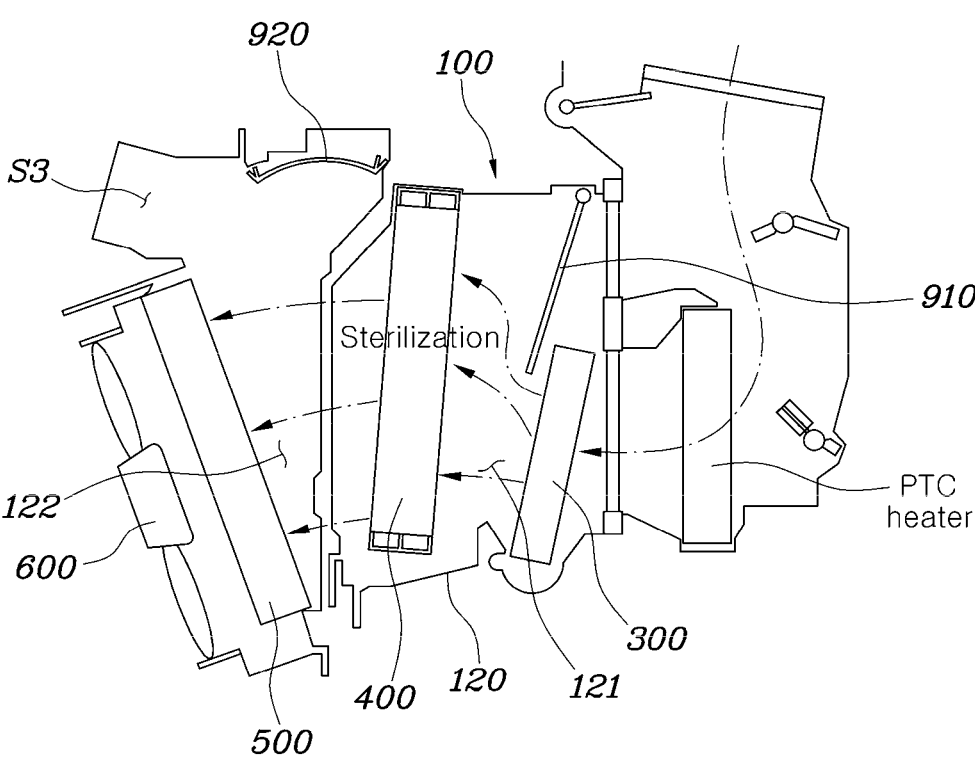
FIG. 8 and FIG. 9 illustrate a condense water removal and sterilization mode of a dehumidifier of the air-conditioning apparatus for an electric mobility, illustrated in FIG. 1.
Figure 9:
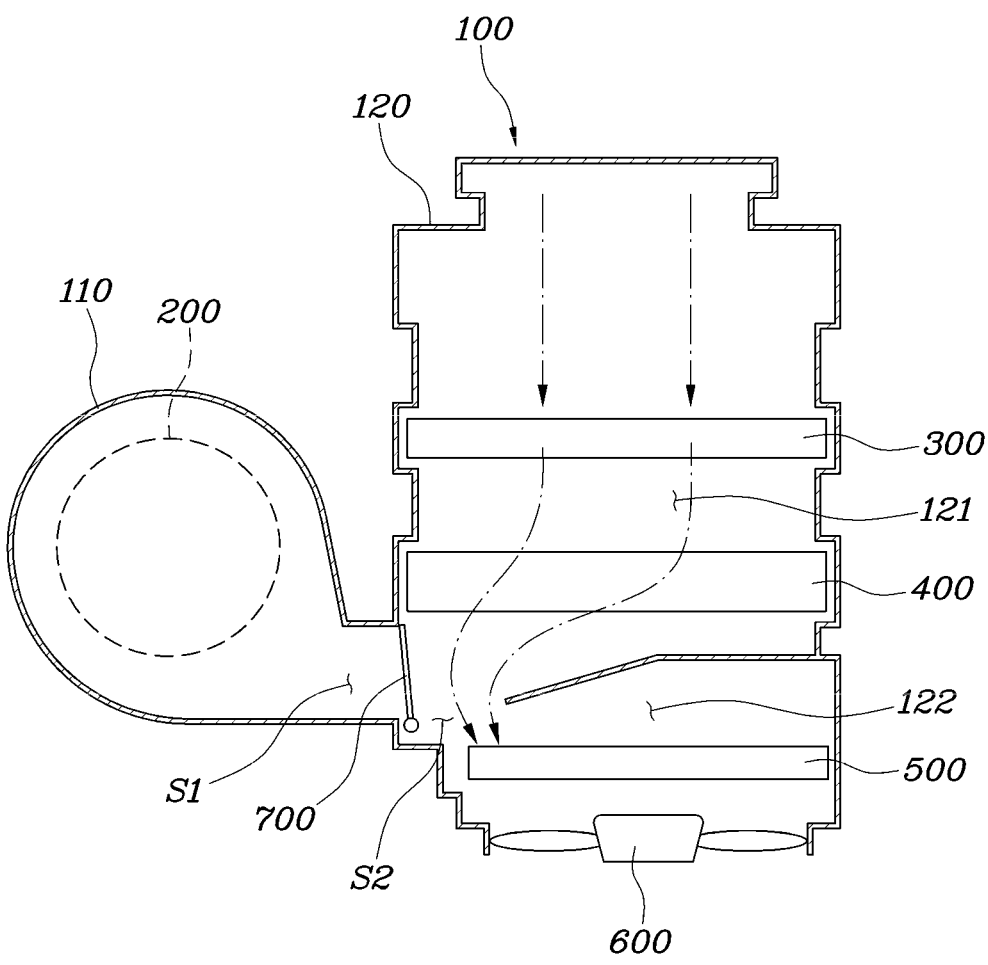

FIG. 8 and FIG. 9 illustrate a condense water removal and sterilization mode of a dehumidifier of the air-conditioning apparatus for an electric mobility, illustrated in FIG. 1.

Figure 10:
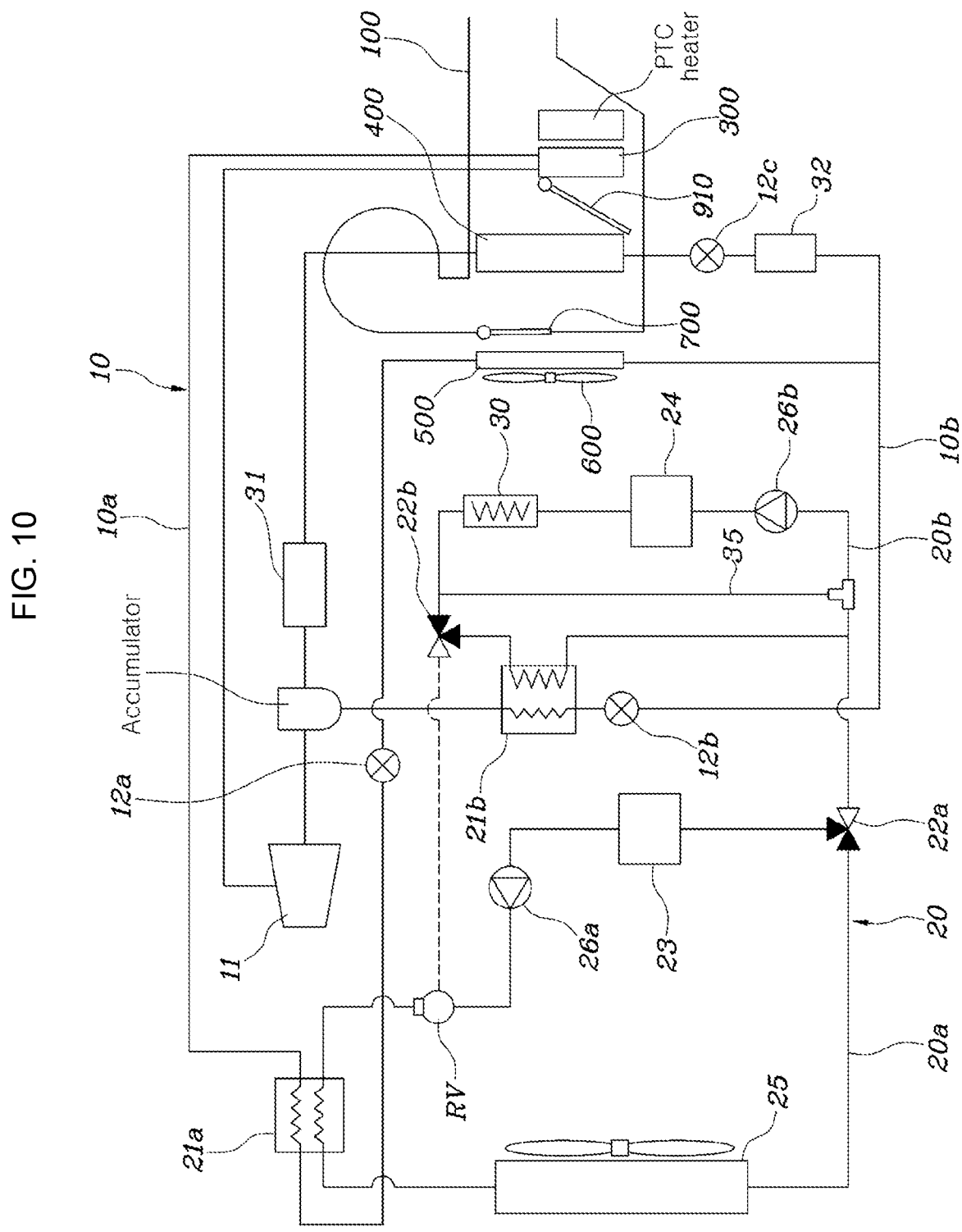
FIG. 10 illustrates the configuration of an air-conditioning system for an electric mobility according to an exemplary embodiment of the present disclosure.
Figure 11:
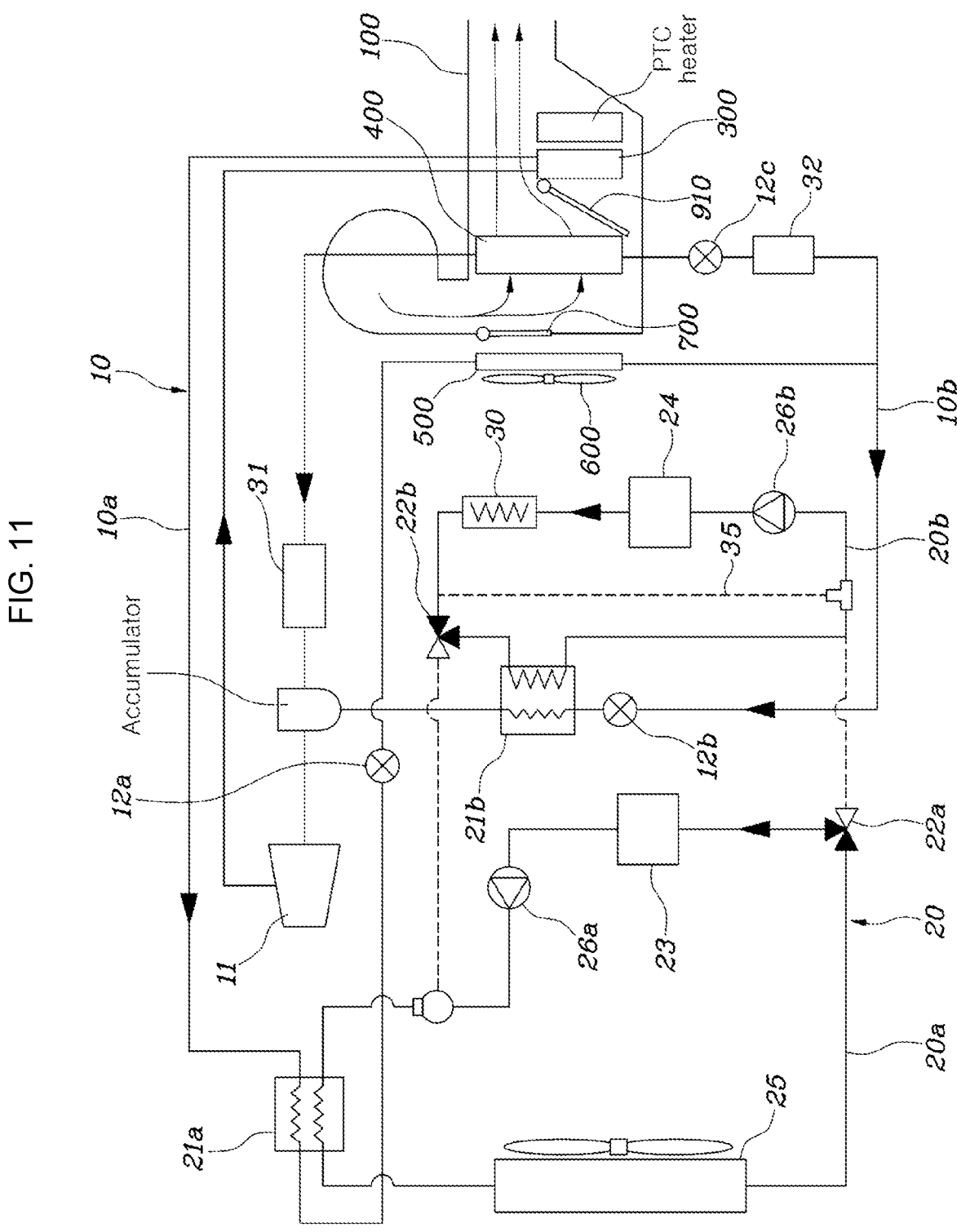
FIG. 11 illustrates cooling of the air-conditioning system for an electric mobility, illustrated in FIG. 10.
Figure 12:
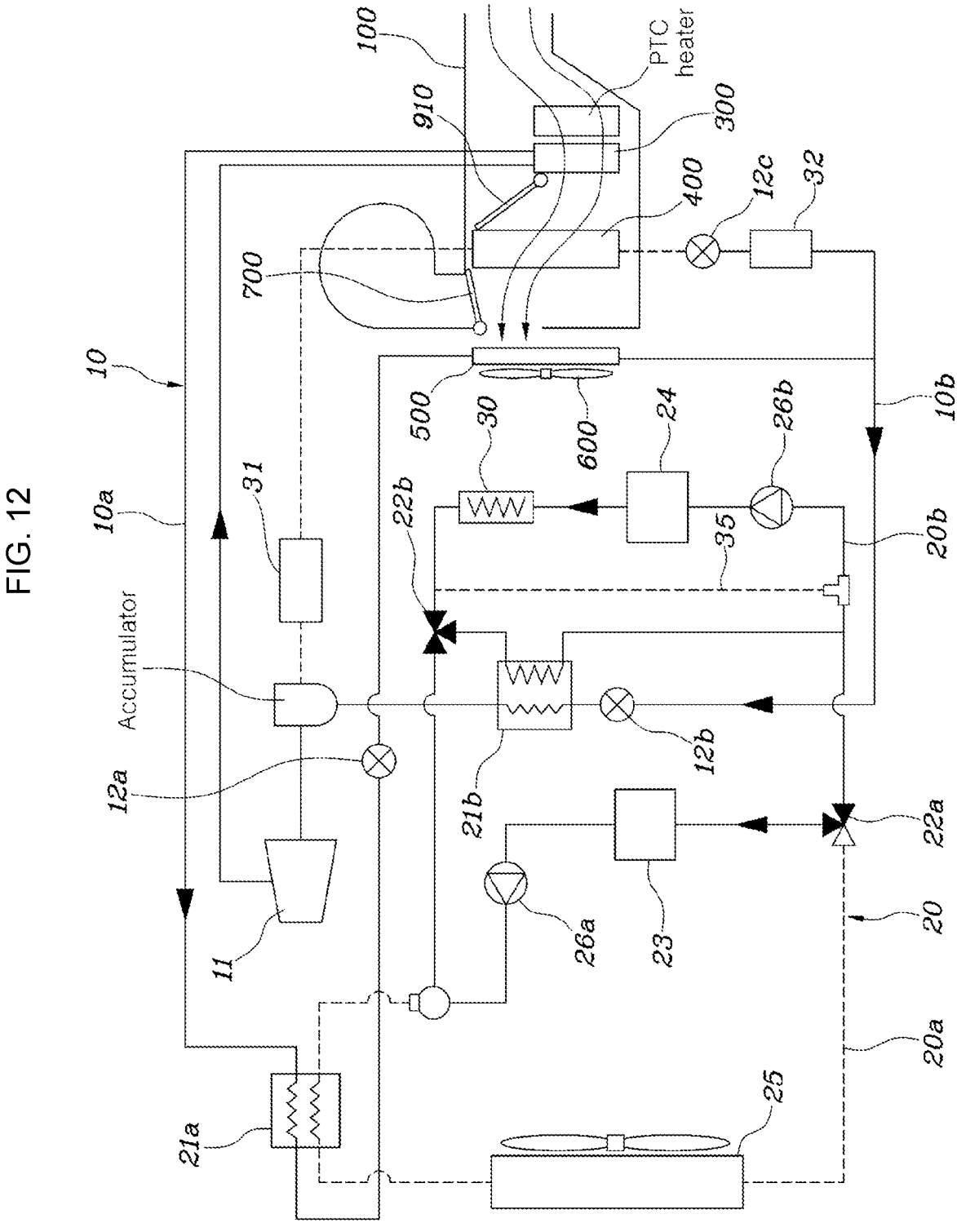
FIG. 12 illustrates condense water removal and sterilization by a dehumidifier of the air-conditioning system for an electric mobility, illustrated in FIG. 10.

FIG. 10 illustrates the configuration of an air-conditioning system for an electric mobility according to an exemplary embodiment of the present disclosure. FIG. 11 illustrates cooling of the air-conditioning system for an electric mobility, illustrated in FIG. 10. FIG. 12 illustrates condense water removal and sterilization by a dehumidifier of the air-conditioning system for an electric mobility, illustrated in FIG. 10.

As illustrated in FIG. 1, FIG. 2, FIG. 3, and FIG. 4, an air-conditioning apparatus for an electric mobility, according to an exemplary embodiment of the present disclosure, may include: a housing 100 which includes a main blower 200 and in which air flows when the main blower 200 operates; an internal condenser 300 configured to heat air in the housing 100 and an evaporator 400 configured to cool air in the housing 100; an external condenser 500 provided in a direction in which the internal condenser 300 and the evaporator 400 are provided; an auxiliary blower 600 provided so that air flows outside through the internal condenser 300, the evaporator 400, and the external condenser 500; a flow channel control door 700 configured to selectively regulate the air flow caused by the main blower 200 or the auxiliary blower 600; and a controller 800 configured to receive an input regarding cooling/heating or whether to sterilize the evaporator 400, and control the flow channel control door 700 so that air flows inside by operation of the main blower 200 while the air is cooled/heated, and such that, while condensed water of the evaporator is removed and the evaporator is sterilized, air is heated through the internal condenser 300 by operation of the auxiliary blower 600 and then provided to the evaporator 400.

Thus, according to an exemplary embodiment of the present disclosure, air flowing in the housing 100 may be heated by passing through the internal condenser 300 to form heating air, and may be cooled by passing through the evaporator 400 to form cooling air. In order to improve heating performance, a separate PTC heater, in addition to the internal condenser 300, may be further provided.

The internal condenser 300, the external condenser 500, and the evaporator 400 may be configured to ensure cooling/heating efficiency through a heat pump which exchanges heat with another cooling medium during the circulation of a refrigerant.

In the present disclosure, in order to sterilize the evaporator 400 after cooling air-conditioning air, the auxiliary blower 600 and the flow channel control door 700 may be provided in the housing 100. Each of elements including the main blower 200, the auxiliary blower 600, and the flow channel control door 700 may be controlled by the controller 800.

In an exemplary embodiment of the present invention, an actuator such as a step motor is mounted to the flow channel control door 700 and electrically connected to the controller 800.

In the housing 100, air may flow when the main blower 200 or the auxiliary blower 600 operates.

When the main blower 200 operates, outside air or inside air may be introduced into the housing 100, and the outside air or the inside air, the temperature of which has been adjusted through the evaporator 400 or the internal condenser 300, may be provided as air-conditioning air into the mobility. At the instant time, the flow channel control door 700 may be positioned to allow the flow of air introduced by the main blower 200 and to block the flow of air toward the auxiliary blower 600. Furthermore, when providing the internal air-conditioning air, the evaporator 400 and the internal condenser 300 may be activated so that the temperature of air flowing to the mobility is adjusted based on the temperature needed in mobility. Air may selectively flow to the evaporator 400 and the internal condenser 300 by a temperature adjustment door 910.

When the auxiliary blower 600 operates, inside air may be introduced into the housing 100, and the air may be heated through the internal condenser 300 and provided to the evaporator 400. At the instant time, the flow channel control door 700 may be positioned to block the flow of air introduced by the main blower 200 and allow the flow of air toward the external condenser 500. Furthermore, when a request for the sterilization of the evaporator 400 is made, the air heated through the internal condenser 300 may be supplied to the evaporator 400 while the evaporator 400 is deactivated. Thus, the high-temperature air heated through the internal condenser 300 may dry condensed water generated in the evaporator 400, and may sterilize the evaporator 400 at a high temperature.

As illustrated in FIG. 2, the housing 100 may include a first housing 110 in which the main blower 200 is provided to make outside air or inside air flow, and a second housing 120 which fluidically-communicates with the first housing 110 and in which the internal condenser 300, the evaporator 400, the external condenser 500, and the auxiliary blower 600 are provided.

That is, the housing 100 may include the first housing 110 and the second housing 120, wherein the first housing 110 may include an inside/outside air door, a filter, etc., which are not shown, in addition the main blower 200, and the second housing 120 may include the internal condenser 300, the evaporator 400, the external condenser 500, and the auxiliary blower 600.

Thus, when the main blower 200 operates, inside air or outside air may flow from the first housing 110 to the second housing 120, and may be supplied into the mobility after the temperature of the inside air or the outside air is adjusted through the evaporator 400 or the internal condenser 300.

Furthermore, when the auxiliary blower 600 operates, internal air may be discharged outside through the internal condenser 300, the evaporator 400, and the external condenser 500. The high-temperature air having passed through the internal condenser 300 may remove condensed water generated in the evaporator 400, and may exchange heat with the external condenser 500, whereby a heat pump may be implemented.

The internal condenser 300, the evaporator 400, the external condenser 500, and the auxiliary blower 600 may be provided in a straight line in the second housing 120.

Conventionally, the evaporator 400 is provided to be spaced from the internal condenser 300, and thus it is not possible to remove condensed water and sterilize the evaporator 400 by use of the internal condenser 300 as an exemplary embodiment of the present disclosure. Therefore, in the present disclosure, the internal condenser 300, the evaporator 400, the external condenser 500, and the auxiliary blower 600 may be provided in a straight line, and thus, when the auxiliary blower 600 operates, air may sequentially pass through the internal condenser 300, the evaporator 400, and the external condenser 500 and the high-temperature air having passed through the internal condenser 300 may be smoothly supplied to the evaporator 400.

The second housing 120 includes a first space 121, in which the internal condenser 300 and the evaporator 400 are provided, and a second space 122, in which the external condenser 500 and the auxiliary blower 600 are provided. The first housing 110 may fluidically-communicate with the first space 121 of the second housing 120 through a first flow channel S1, the first space 121 and the second space 122 of the second housing 120 may fluidically-communicate with each other through a second flow channel S2, and the flow channel control door 700 may be provided to selectively open or close the first flow channel S1 and the second flow channel S2.

Thus, air flowing in the second housing 120 may have a temperature adjusted through the internal condenser 300 and the evaporator 400 of the first space 121, and may exchange heat with the external condenser 500 of the second space 122, whereby a heat pump may be implemented.

The flow channel control door 700 may selectively open or close the first flow channel S1, through which the first housing 110 fluidically-communicates with the second housing 120, and the second flow channel S2, through which connects the first space 121 of the second housing 120 to the second space 122, so that air flows from the first housing 110 to the second housing 120 through the first flow channel S1 or air flows from the first space 121 to the second space 122 through the second flow channel S2. Furthermore, one flow channel control door 700 may control opening/closing of the first flow channel S1 and the second flow channel S2, whereby the number of elements may be reduced, and thus a package may be miniaturized.

In the housing 100, the temperature adjustment door 910 may be provided between the internal condenser 300 and the evaporator 400, and air may selectively flow to the internal condenser 300 and the evaporator 400 by the temperature adjustment door 910. The temperature adjustment door 910 may be provided between the internal condenser 300 and the evaporator 400, and may operate in a sliding manner or in a rotation manner. Furthermore, the temperature adjustment door 910 may completely or partially open or close the internal condenser 300 or the evaporator 400 so that temperature of flowing air is adjusted as the flowing air passes through the internal condenser 300 and the evaporator 400.

In the second space 122 of the second housing 120, a third flow channel S3, through which outside air flows, may be formed, and an external flow channel door 920 configured to selectively open or close the third flow channel S3 may be provided. That is, the external condenser 500 is required to perform heat exchange through air circulation in order to implement the heat pump, the third flow channel S3, through which external air flows, may be formed in the second space 122 of the second housing 120 so that the outside air exchanges heat with the external condenser 500.

Furthermore, in the present disclosure, air flowing by operation of the auxiliary blower 600 may exchange heat with the external condenser 500 during sterilization of the evaporator 400 and removal of condensed water, implementing a heat pump. Therefore, the external flow channel door 920 for selectively opening or closing the third flow channel S3 may be provided.

Thus, the external condenser 500 may exchange heat with outside air circulated through the third flow channel S3, implementing a heat pump, and may exchange heat with air having passed through the internal condenser 300 and the evaporator 400 during sterilization of the evaporator 400 and removal of condensed water, maintaining the implementation of the heat pump.

Thus, while cooling air, the controller 800 may perform control so that the main blower 200 operates, air cooling operation by the evaporator 400 is activated, the flow channel control door 700 opens the first flow channel S1, and the temperature adjustment door 910 blocks the flow of air to the internal condenser 300.

That is, as illustrated in FIG. 5 and FIG. 6, when internal air cooling is required, the controller 800 may operate the main blower 200 so that inside air or outside air flows into the mobility. At the instant time, the controller 800 may control refrigerant circulation so that the air cooling operation of the evaporator 400 is activated, may control the flow channel control door 700 to open the first flow channel S1, and may control the temperature adjustment door 910 to block the flow of air to the internal condenser 300. Thus, the inside air or the outside air flowing at the time of operation of the main blower 200 may be cooled by passing through the evaporator 400, and cooled cooling air may be provided into the mobility.

In an exemplary embodiment of the present invention, the temperature adjustment door 910 may include an actuator such as a step motor and electrically connected to the controller 800.

Furthermore, the controller 800 may control the external flow channel door 920 to open the third flow channel S3 while air is cooled, and thus outside air circulated through the third flow channel S3 may exchange heat with the external condenser 500, whereby the heat pump may be implemented.

As illustrated in FIG. 7, the controller 800 may perform control during air heating so that the main blower 200 operates, the air cooling operation by the evaporator 400 is deactivated, the flow channel control door 700 opens the first flow channel S1, and the temperature adjustment door 910 allows the flow of air to the internal condenser 300.

That is, when internal air heating is required, the controller 800 may operate the main blower 200 so that inside air or outside air flows into the mobility. At the instant time, the controller 800 may control refrigerant circulation so that the evaporator 400 is deactivated, may control the flow channel control door 700 to open the first flow channel S1, and may control the temperature adjustment door 910 to allow the flow of air of the internal condenser 300. Thus, inside air or outside air flowing at the time of operation of the main blower 200 may be heated by passing through the internal condenser 300, and the heated heating air may be provided into the mobility.

Furthermore, the controller 800 may control the external flow channel door 920 to open the third flow channel S3 while air is heated, and thus outside air circulated through the third flow channel S3 may exchange heat with the external condenser 500, whereby the heat pump may be implemented.

As illustrated in FIG. 8 and FIG. 9, the controller 800 may perform control during the sterilization of the evaporator 400 so that the auxiliary blower 600 operates, air cooling operation by the evaporator 400 is deactivated, the flow channel control door 700 opens the second flow channel S2, and the temperature control door allows the flow of air to the internal condenser 300.

That is, when the sterilization of the evaporator 400 and the removal of condensed water are required after internal cooling, the controller 800 may operates the auxiliary blower 600 so that internal air flows in the housing 100 in a direction in which the internal air is discharged to the outside. Thus, when the auxiliary blower 600 operates, internal cooling may be performed, and thus internal dry air may be introduced into the housing 100, effectively sterilizing the evaporator 400 and effectively removing the condensed water.

Furthermore, the controller 800 may control refrigerant circulation so that the evaporator 400 is deactivated, may control the flow channel control door 700 to open the second flow channel S2, and may control the temperature adjustment door 910 to allow the flow of air to the internal condenser 300. Thus, internal air flowing at the time of operation of the auxiliary blower 600 may be heated by passing through the internal condenser 300, and the heated air may be supplied to the evaporator 400, sterilizing the evaporator 400 and removing the condensed water.

Furthermore, the controller 800 may control the external flow channel door 920 to close the third flow channel S3 during the sterilization of the evaporator 400. Thus, internal air flowing during operation of the auxiliary blower 600 may flow through the internal condenser 300, the evaporator 400, and the external condenser 500. Furthermore, during the sterilization of the evaporator 400 and the removal of the condensed water, the external condenser 500 may exchange heat air having passed through with the internal condenser 300 and the evaporator 400, whereby the implementation of the heat pump may be maintained.

The controller 800 may receive information about whether there is a passenger in the mobility when sterilizing the evaporator 400, and may control the sterilization of the evaporator 400 to be performed when there is no passenger in the mobility.

The controller 800 may determine, through a pressure detector provided in a seat or a camera detector configured to image the inside of the mobility, whether there is a passenger in the mobility. The controller 800 may determine whether there is a passenger in the mobility, and may control the sterilization of the evaporator 400 to be performed when the passenger is not present in the mobility, and thus may prevent the passenger from feeling unpleasant and uncomfortable while sterilizing the evaporator 400 by use of internal air.

As illustrated in FIG. 10, an air-conditioning system for an electric mobility, according to an exemplary embodiment of the present disclosure, may include: a refrigerant line 10 in which a refrigerant is circulated and which includes a compressor 11, an internal condenser 300, an external condenser 500, an expander 12, and an evaporator 400; and a coolant line 20 in which a coolant is circulated and which includes a heat exchanger 21, in which the coolant exchanges heat with the refrigerant, a valve 22, an electronic equipment module 23, a battery module 24, and a radiator 25.

The coolant line 20 may include a first coolant line 20a, which includes the radiator 25, a first heat exchanger 21a, a reservoir (RV), a first water pump 26a, the electronic equipment module 23, and a first valve 22a, and a second coolant line 20b, which branches from the reservoir (RV) of the first coolant line 20a and includes a second valve 22b, the battery module 24, a second water pump 26b, and a second heat exchanger 21b.

Furthermore, the refrigerant line 10 may include a first refrigerant line 10a, which includes the compressor 11, the internal condenser 300, the first heat exchanger 21a, a first expander 12a, the external condenser 500, a second expander 12b, and the evaporator 400, and a second refrigerant line 10b, which branches from the first refrigerant line 10a, is connected to the compressor 11, and includes a third expander 12c and the second heat exchanger 21b.

In the first refrigerant line 10a and the first coolant line 20a, a refrigerant and a coolant may exchange with each other through the first heat exchanger 21a, and in the second refrigerant line 10b and the second coolant line 20b, a refrigerant and a coolant may exchange heat with each other through the second heat exchanger 21b.

Furthermore, the refrigerant line 10 may further include an accumulator configured to circulate a refrigerant, and an additional heater 30 and/or additional heat exchangers 31 and 32 configured to improve the efficiency of heat exchange between a refrigerant and a coolant.

Thus, in the present disclosure, at the time of cooling/heating, a heat pump may be implemented, ensuring air-conditioning efficiency.

In an exemplary embodiment of the present disclosure, while air is cooled, the first expander 12a may be opened, and the second expander 12b and the third expander 12c may expand a refrigerant. The first valve 22a and the second valve 22b are switched so that coolant is circulated in the first coolant line 20a and the second coolant line 20b, respectively.

When the main blower 200 operates, air may have a temperature adjusted by passing through the evaporator 400 or the internal condenser 300, and then may flow into the mobility, and the flow channel control door 700 is opened and operated.

That is, as illustrated in FIG. 11, a refrigerant compressed in the compressor 11 may condensed by dissipating heat while circulating through the internal condenser 300, the first heat exchanger 21a, and the external condenser 500, and then may be expanded by the second expander 12b. Thus, the refrigerant may be evaporated in the evaporator 400, and thus air passing through the evaporator 400 may be cooled.

In the first coolant line 20a, a coolant may cool the electronic equipment module 23, and the coolant cooled through the radiator 25 may exchange heat with the refrigerant through the first heat exchanger 21a so that a refrigerant is cooled in the first heat exchanger 21a. Furthermore, in the second coolant line 20b, a coolant having a temperature increased by cooling the battery module 24 may exchange heat with a refrigerant in the second heat exchanger 21b, and thus may have an adjusted temperature at which the coolant can cool the battery module 24.

Thus, air to be provided into the mobility may be cooled.

In present disclosure, heating air to be provided into the mobility, which is a process for sterilization of the evaporator 400 and removal of condensed water after cooling, is an exemplary embodiment of the heat pump process, and a description thereof will be omitted.

As illustrated in FIG. 12, when sterilizing the evaporator 400, the first expander 12a may expand the refrigerant, the second expander 12b may be closed, the third expander 12c may be opened, and the first valve 22a and the second valve 22b may be switched so that the coolant is circulated in the second coolant line 20b, together with the first water pump 26a and the electronic equipment module 23 of the first coolant line 20a.

At the present time, the auxiliary blower 600 may operate so that air is heated through the internal condenser 300 and then provided to the evaporator 400, and the flow channel control door 700 may be closed and operated.

The refrigerant compressed in the compressor 11 may be condensed by dissipating heat while circulating through the internal condenser 300 and the first heat exchanger 21a, and then the refrigerant may be expanded by the first expander 12a. Thus, in the second heat exchanger 21b, the low-temperature refrigerant may exchange heat with the coolant, and thus the coolant may be cooled.

Furthermore, the sterilization of the evaporator 400 and the removal of condensed water may be performed while there is no passenger, and thus the temperature of the electronic equipment module 23 and the battery module 24 may become relatively low. Therefore, cooling of the electronic equipment module 23 and the battery module 24 may be smoothly performed only by heat exchange made through the second heat exchanger 21b In the air-conditioning apparatus for an electric mobility, having the above-described structure, and the air-conditioning system for an electric mobility, using the same, a heat pump may be used to provide high-temperature air generated through an internal condenser to an evaporator, removing condensed water generated in the evaporator after cooling, and sterilizing the evaporator.

In an exemplary embodiment of the present invention, a branch line 35 is provided on the second coolant line 20b connecting between the second valve 22b and the second water pump 26b and the second water pump 26b and the second heat exchanger 21b.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air-conditioning apparatus for an electric mobility vehicle, the air-conditioning apparatus comprising:
   a housing which includes a main blower therein and in which air flows when the main blower operates;
   an internal condenser configured to heat air in the housing;
   an evaporator disposed to face the internal condenser and be spaced apart from the internal condenser so that the evaporator cools air in the housing;

an external condenser disposed to be spaced apart from the evaporator and provided in the housing in a direction in which the internal condenser and the evaporator are arranged;

an auxiliary blower provided in the housing operable to flow air outside the housing through the internal condenser, the evaporator, and the external condenser;

a flow channel control door configured to selectively regulate a flow of air caused by the main blower or the auxiliary blower; and a controller configured to control the flow channel control door so that:

air flows inside the housing by operation of the main blower when the air is cooled or heated; or when condensed water of the evaporator is removed and the evaporator is sterilized, air is heated through the internal condenser by operation of the auxiliary blower and then provided to the evaporator.

2. The air-conditioning apparatus of claim 1, wherein the housing includes:

a first housing, in which the main blower is provided to make outside air or inside air flow; and a second housing, which fluidically-communicates with the first housing and in which the internal condenser, the evaporator, the external condenser, and the auxiliary blower are provided.

3. The air-conditioning apparatus of claim 2, wherein the second housing includes:

a first space, in which the internal condenser and the evaporator are provided; and a second space, in which the external condenser and the auxiliary blower are provided, wherein the first housing fluidically-communicates with the first space of the second housing through a first flow channel, the first space and the second space of the second housing fluidically-communicate with each other through a second flow channel, and the flow channel control door is provided to selectively open or close the first flow channel and the second flow channel.

4. The air-conditioning apparatus of claim 3, wherein a temperature adjustment door is provided between the internal condenser and the evaporator in the housing, and air selectively flows to the internal condenser and the evaporator according to operation of the temperature adjustment door.

5. The air-conditioning apparatus of claim 4, wherein the controller is configured to perform control of the main blower, the flow channel control door and the temperature adjustment door during air cooling so that the main blower operates, an air cooling operation by the evaporator is activated, the flow channel control door opens the first flow channel, and the temperature adjustment door blocks a flow of air to the internal condenser.

6. The air-conditioning apparatus of claim 4, wherein the controller is configured to perform control of the main blower, the evaporator, the flow channel control door and the temperature adjustment door during air heating so that the main blower operates, an air cooling operation by the evaporator is deactivated, the flow channel control door opens the first flow channel, and the temperature adjustment door allows a flow of air to the internal condenser.

7. The air-conditioning apparatus of claim 4, wherein the controller is configured to perform control of the auxiliary blower, the evaporator, the flow channel control door and the temperature control door during the sterilization of the evaporator so that the auxiliary blower operates, an air cooling operation by the evaporator is deactivated, the flow channel control door opens the second flow channel, and the temperature control door allows a flow of air to the internal condenser.

8. The air-conditioning apparatus of claim 3, wherein, in the second space of the second housing, a third flow channel, through which outside air flows, is formed, and an external flow channel door to selectively open or close the third flow channel is provided in the second housing.

9. The air-conditioning apparatus of claim 8, wherein the controller is configured to control the external flow channel door to open the third flow channel while air is cooled or heated, and control the external flow channel door to close the third flow channel while the evaporator is sterilized.

10. The air-conditioning apparatus of claim 2, wherein the internal condenser, the evaporator, the external condenser, and the auxiliary blower are arranged in a straight line in the second housing.

11. The air-conditioning apparatus of claim 1, wherein the controller is configured to receive information about whether there is a passenger in the mobility vehicle when sterilizing the evaporator, and control the sterilization of the evaporator to be performed when the controller concludes that there is no passenger in the mobility vehicle.

12. An air-conditioning system for the electric mobility vehicle, according to the air-conditioning apparatus in claim 1, the air-conditioning system comprising:

a refrigerant line in which a refrigerant is circulated and which includes a compressor, the internal condenser, the external condenser, an expander, and the evaporator; and a coolant line in which a coolant is circulated and which includes a heat exchanger, in which the coolant exchanges heat with the refrigerant, a valve, an electronic equipment module, a battery module, and a radiator.

13. The air-conditioning system of claim 12, wherein the valve includes a first valve and a second valve, wherein the heat exchanger includes a first heat exchanger and a second heat exchanger, and wherein the coolant line includes:

a first coolant line, which includes the radiator, the first heat exchanger, a reservoir, a first water pump, the electronic equipment module, and the first valve; and a second coolant line, which branches from the reservoir of the first coolant line and connected to the first valve, wherein the second coolant line includes the second valve, the battery module, a second water pump, and the second heat exchanger.

14. The air-conditioning system of claim 13, wherein the second valve is a three way valve connected to the reservoir, the battery module and the second heat exchanger.

15. The air-conditioning system of claim 13, wherein a branch line is provided on the second coolant line and connects a first point between the second valve and the battery module and a second point between the second water pump and the second heat exchanger.

16. The air-conditioning system of claim 13, wherein the expander includes a first expander, a second expander and a third expander, and wherein the refrigerant line includes:

a first refrigerant line, which includes the compressor, the internal condenser, the first heat exchanger, the first expander, the external condenser, the second expander, and the evaporator; and a second refrigerant line, which branches from the first refrigerant line, is connected to the compressor, and includes the third expander and the second heat exchanger.

17. The air-conditioning system of claim 16, wherein the first refrigerant line further includes an accumulator, and wherein the second refrigerant line branches from the accumulator of the first refrigerant line and is connected to the second heat exchanger.

18. The air-conditioning system of claim 16, wherein, during air cooling, the first expander is configured to be opened, and the second expander and the third expander are configured to expand the refrigerant, and the first valve and the second valve are configured to be switched so that the coolant is circulated in the first coolant line and the second coolant line, respectively.

19. The air-conditioning system of claim 16, wherein, during the sterilization of the evaporator, the first expander is configured to expand the refrigerant, the second expander is configured to be closed, and the third expander is configured to be opened, and the first valve and the second valve are configured to be switched so that the coolant is circulated in the second coolant line, together with the first water pump and the electronic equipment module of the first coolant line.

\* \* \* \* \*